United States Patent
Inserra Imparato et al.

(10) Patent No.: US 8,388,789 B2
(45) Date of Patent: Mar. 5, 2013

(54) METHOD OF MANUFACTURING A FUSELAGE FRAME OF COMPOSITE MATERIAL

(75) Inventors: Sabato Inserra Imparato, Gragnano (IT); Luigi Avagliano, Baronissi (IT); Diego De Luca, Torre Annunziata (IT)

(73) Assignee: Alenia Aeronautica S.p.A., Pomigliano d'Arco, Naples (IT)

(*) Notice: Subject to any disclaimer, the term of this patent is extended or adjusted under 35 U.S.C. 154(b) by 355 days.

(21) Appl. No.: 12/881,918

(22) Filed: Sep. 14, 2010

(65) Prior Publication Data
US 2011/0100538 A1    May 5, 2011

(30) Foreign Application Priority Data
Sep. 15, 2009  (IT) ............... TO2009A0701

(51) Int. Cl.
B29C 65/00  (2006.01)
B32B 27/02  (2006.01)
B32B 27/04  (2006.01)

(52) U.S. Cl. ........ 156/222; 156/196; 156/267; 156/285; 156/286

(58) Field of Classification Search ............... None
See application file for complete search history.

(56) References Cited

U.S. PATENT DOCUMENTS
2007/0029038 A1   2/2007 Brown et al.
2009/0263618 A1*  10/2009 McCarville et al. ........ 428/113

FOREIGN PATENT DOCUMENTS
EP           0 318 867 A2   6/1989
WO   WO 2009/016552 A2     2/2009
WO   WO 2009/037647 A2     3/2009

* cited by examiner

Primary Examiner — Barbara J. Musser
(74) Attorney, Agent, or Firm — Merchant & Gould P.C.

(57) ABSTRACT

For an arcuate structural member (10) of a fuselage frame, tapes of resin pre-impregnated unidirectional fibers are used. The member (10) includes a web (11) lying in a radial plane and a radially outer cylindrical flange (12). An elongate, arcuate forming mandrel (M1) having a flat radial surface (F) forming an angular edge (D) with a radially outer, convex cylindrical surface (S) is used and a series of promontories (P) radiating outwardly with respect to the cylindrical surface (S) are provided. Layers of pre-impregnated composite material are laid on the mandrel (M1) to form a first flat arcuate laminate (20'), with a part (20") of the laminate projecting radially outwardly beyond the angular edge (D). The mandrel (M1), the laminate (20') and the promontories (P) are covered with a membrane (E). A vacuum is then applied to urge the projecting part (20") of the laminate against the cylindrical surface (S) and against the promontories (P). Contact of the projecting part (20") with the cylindrical surface (S) near the promontories is prevented or retarded. Finally, discrete portions of the projecting part (20") near the promontories are removed, obtaining peripheral cavities (15) spaced apart from one another.

7 Claims, 3 Drawing Sheets

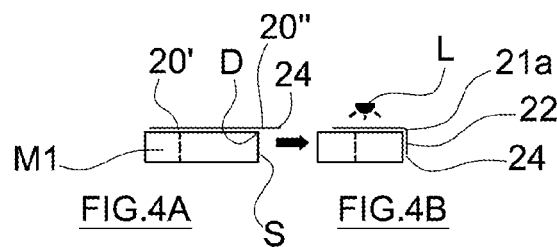
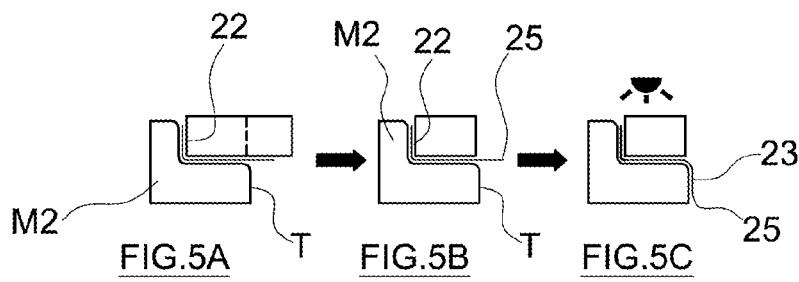
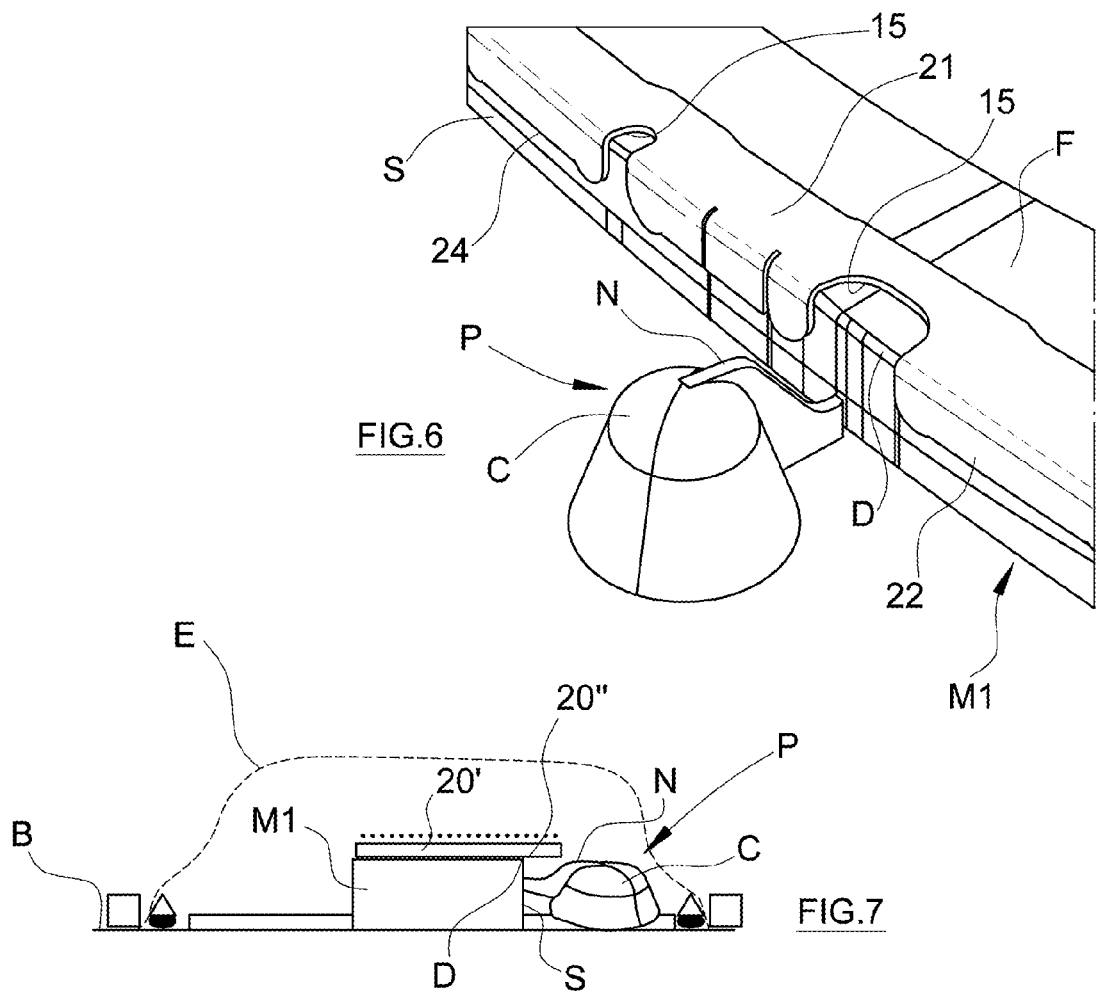

METHOD OF MANUFACTURING A FUSELAGE FRAME OF COMPOSITE MATERIAL

This application claims benefit of Serial No. TO2009A000701, filed 15 Sep. 2009 in Italy and which application is incorporated herein by reference. To the extent appropriate, a claim of priority is made to each of the above disclosed applications.

BACKGROUND OF THE INVENTION

The present invention relates to a method of manufacturing a fuselage frame of composite material.

SUMMARY OF THE INVENTION

Fuselage frames made up of arcuate structural elements with a circumferential length of up to 6 metres, advantageously made of composite material to optimize the stiffness/weight ratio, are known. Frames must resist "hoop stress", that is, prevent the fuselage from expanding as a result of the pressure differential with the exterior which occurs during flight. In some applications the fuselage frames must be Z-shaped in cross section.

To increase the structural efficiency of these members, the direction of some of the reinforcing fibers, which may be carbon or fibreglass or the like, must lie in the same arcuate or circumferential direction as the structural member.

This requirement cannot be met using traditional composite materials pre-impregnated through conventional processes, the problem being that these materials are produced from tows of straight fibers, fabrics or unidirectional tapes impregnated in resin film in a continuous process. Because of the continuous nature of these materials, conventional hand or automatic lay-up processes cannot be used when the reinforcing fibers are in an arcuate arrangement, because if traditional prepregs with straight fibers are deformed in an attempt to give the member an arcuate shape, wrinkles inevitably form in the fibers situated where the radius of the bend or curve is smaller.

To overcome the limits imposed by pre-impregnation and make arcuate structural components, a variety of methods have been developed, but they have various drawbacks. In particular, processes have been developed that make it possible to assemble layers of reinforcement with arcuate fibers, such as planar curved braided layers and spiral fabrics, which partly solve the problem. However, these planar members must be formed within the geometry of the component which it is wished to produce (e.g. C-section frames or L-section shear ties), before being impregnated in resin. The shaping of these fabrics is critical because the unimpregnated fibers deviate easily from the original direction, ending up in unpredictable positions not consistent with the design. To overcome this problem a technology based on a special fabric-forming technique known as overbraiding has been developed. In this technique the reinforcing fibre is woven by special machines on a temporary supporting mandrel having the same arcuate shape as the component that is to be produced, its cross section being suitable for conversion, by a single longitudinal cut, into the cross section of the component which it is wished to produce.

However, even overbraiding technology has some significant limitations. Specifically:

the reinforcing fibers cannot be oriented in all directions as would be desirable to increase the structural performance, but only within a very restricted range, normally in the range from about +70° to −70° with respect to the longitudinal direction of the finished member. It is therefore not possible to charge fibers at 90° (with respect to the longitudinal direction of the member), which are typical of the lay-up of composite structural components;

the fragility of the preforms means that from the moment of fabric formation to the moment of use the preforms must be supported by the auxiliary fabric-forming mandrels, creating problems of costs and logistics of transport and storage. It also requires a large number of expensive supporting mandrels;

the cross sections achievable with the overbraiding process are limited to those that can be derived from a C-type closed cross section. Other cross sections are difficult to produce and have quality problems: fibre orientation not as intended, wrinkles, etc.;

the cross sections achievable with the overbraiding process are limited to those of constant thickness and cannot be varied with respect to the cross section of the member;

the process of infusing the reinforcing preform with resin is very complicated and limits the types of resin that can be used.

Another method, discussed in WO 2009/016552 A in the name of the present Applicant, is based on resin pre-infusion of planar layers of reinforcements braided with fibers that are already arcuate, with a constant radius that interpolates that of the component to be produced, which is generally of variable radius. This process overcomes certain limitations of the previous process in that it is possible to vary the thickness in the cross section and it does not require fabric-forming mandrels, but is suitable for components in which the local variations of radius are not more than 5-10% of the radius of the planar members, since otherwise unacceptable wrinkles would form when shaped to give the final form of the component.

It is an object of the invention to manufacture frames comprising reinforcing fibers oriented circumferentially in the web of the frame and using unidirectional prepreg tapes, avoiding the formation of wrinkles. Unidirectional prepreg tapes are advantageous because they are standardized materials whose properties of structural resistance are known precisely and which do not have the drawbacks indicated above. Their use also allows great freedom in selecting the positions of the doublers. Another object of the invention is to provide a method that is especially advantageous for manufacturing Z-section frames.

These and other objects and advantages, which will be understood more clearly hereinafter, are achieved by the present invention.

BRIEF DESCRIPTION OF THE DRAWINGS

A preferred but not limiting embodiment of the invention will now be described. The appended drawings are referred to, in which:

FIGS. 4A-4B and 5A-5C show diagrammatically certain steps in the formation of a laminate containing the structural member shown in FIG. 1;

FIG. 6 is a diagrammatic perspective view of part of a member arranged on a forming tool;

FIG. 7 is a diagrammatic view of a shaping step in the method according to the invention.

DETAILED DESCRIPTION OF THE PREFERRED EMBODIMENTS

Figure 2:
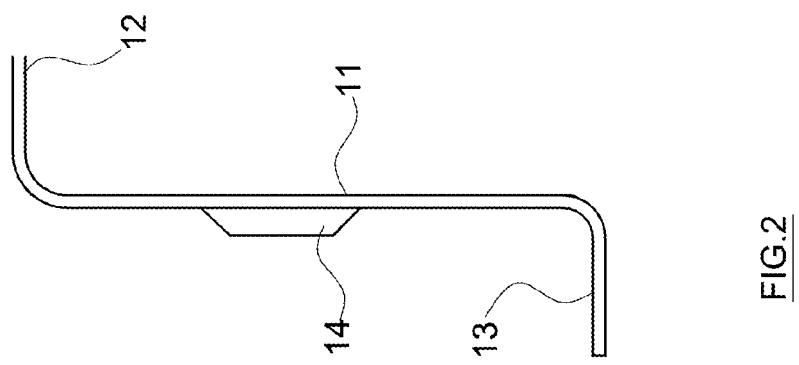
FIG. 2 is a cross section through the member shown in FIG. 1.
Figure 1:
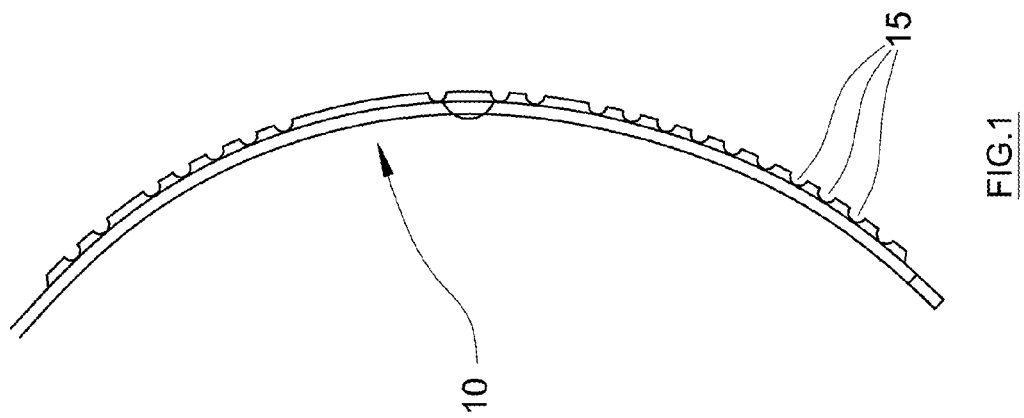
FIG. 1 is a cross section through a structural member for forming a fuselage frame.
Figure 8:
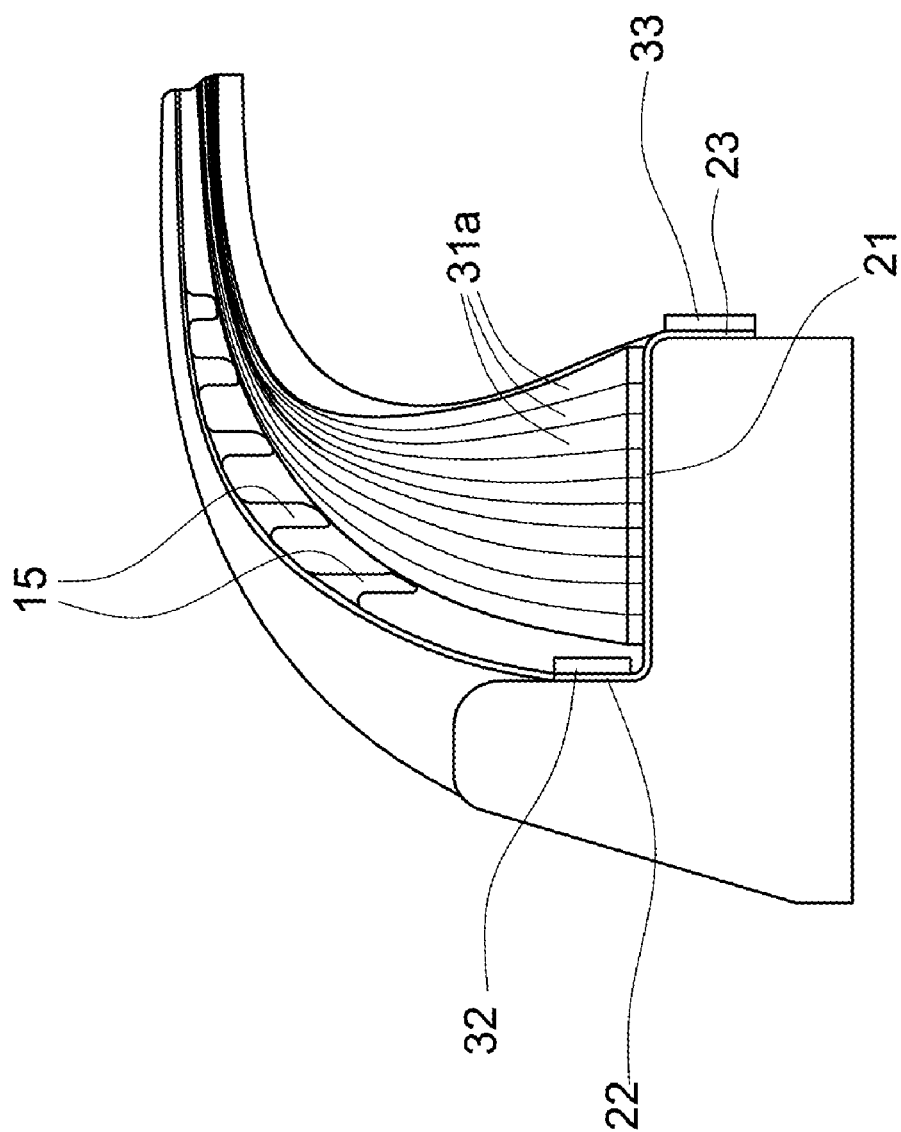
FIG. 8 is a perspective diagrammatic view, partially in section, of part of the tool shown in FIG. 6 during a step in the method which comes after that shown in FIG. 6.

Referring initially to FIGS. 1 and 2, reference number 10 designates overall an arcuate structural member of so-called Z cross section for the construction of a frame, a stiffening part of the fuselage of an aircraft. The member 10 has a web 11 lying in a radial plane, a radially outer flange 12 and a radially inner flange 13, the latter two forming two coaxial cylindrical surfaces. Reference 14 denotes a local thickening or "doubler", which extends in a circumferential direction, at right angles to the plane of the drawing when viewing FIG. 2.

The finished member 10, as illustrated in FIG. 1, comprises a series of circumferentially spaced rounded peripheral cavities or openings 15. The cavities 15 accommodate the parallel longitudinal stiffeners known as "stringers" (not shown) which lie on the inside surface of the fuselage skin, and which are oriented at right angles to the plane of the drawing of FIG. 1.

Figure 3:
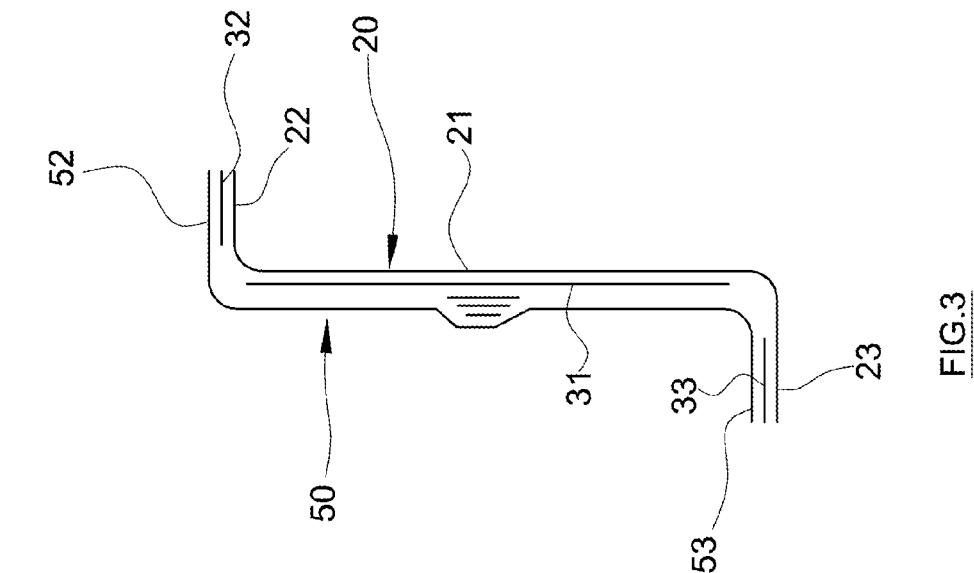
FIG. 3 is a diagrammatic cross section through the component parts of the member shown in FIG. 1.

FIG. 3 diagrammatically shows the portions or "charges" which make up the member 10; purely by way of illustration the charges are shown separate from each other. A Z-shaped first charge is indicated 20. This first charge constitutes that side of the member or "frame" which will later be placed against the forming mandrel during the curing phase in the autoclave. The first charge is a lamination of layers or plies of unidirectional prepreg tapes with carbon fibers oriented in a manner known per se at 45°, −45°, 90°, −45° and 45° with respect to the longitudinal or circumferential direction in which the member 10 extends.

The first charge 20 (FIG. 4A) is formed starting from a flat arcuate laminate 20' which is placed on a radial planar surface F of an elongate and arcuate forming mandrel M1. The planar surface F forms an angular edge D with a convex cylindrical surface S described here as "radially outward" of said mandrel M1. The mandrel is associated with an infrared lamp L. A first bend 21a is imparted to identify an outer flange 22, resulting in an L section (FIGS. 4A-4B); the charge is then placed on a mandrel M2 where the inner flange 23 is formed by bending, giving the Z shape (FIGS. 5A-5C). Reference 21 indicates the radial portion that contributes to forming the web of the member 10.

It will be seen that the bending of the outer flange reduces the diameter because the edge 24 is displaced from an initial circumference which is radially further out, in the initial flat condition (FIG. 4A), to a final circumference which is radially further in, in the flange-bent condition (FIG. 4B). To avoid the formation of wrinkles resulting from this bending operation, the forming tool is associated with a plurality of promontory formations P (only one of these formations is shown in FIGS. 6 and 7). These radiate radially outwardly with respect to the outer cylindrical surface S of the mandrel M1. Each formation P comprises a dome-like body C with a radially oriented vertical wall or rib N connecting the dome C to the outer cylindrical surface S of the mandrel.

As illustrated in FIG. 7, the bend is done using an elastomeric membrane E sealed hermetically to a base B in such a way as to cover the mandrel M1, the charge 20' which is to be bent, and the promontory formations P. The charge 20' is heated with the infrared lamp, and a vacuum is applied between the membrane E and the base B. The vacuum pulls the membrane down onto the mandrel and onto the charge of composite material. The part 20" of the charge projecting beyond the angular edge D is that which is destined to form the flange 22. This projecting part 20", bent by the membrane, comes into contact with and copies the cylindrical shape of the cylindrical surface S of the mandrel in the intermediate areas between the promontories. On the other hand, near the promontories, where the peripheral cavities 15 will be formed, the domes and ribs prevent the membrane from immediately moving towards the surface S of the mandrel. The contact of the membrane in the areas close to the ribs N occurs when the outer flange 22 is already adjacent to the surface S and has copied its shape correctly. In other words, the membrane stops short of the mandrel in the areas near the promontories, or contacts the surface S at a later point, being supported by the projecting promontories, particularly by the ribs N.

As a result of this configuration, the wrinkles which would be produced by the reduction of the radius are guided or forced to form in the area of the promontories. Those portions of the flange which lie astride the promontories are then cut off to form the peripheral cavities 15. The outer flange 22 thus consists of a series of lengths in the form of wrinkle-free cylindrical segments interrupted by cavities 15.

There is no problem of wrinkles when bending the radially inner flange 23 because this involves increasing the diameter, and hence sets up a tensile stress. The radially inner edge 25 is displaced from an initial circumference which is radially further in, in the flat initial condition (FIGS. 5A and 5B), to a final circumference which is radially further out, in the condition in which the inner flange 23 is bent (FIG. 5C) against the concave radially inner cylindrical wall T of the mandrel M2. Therefore this operation does not require the use either of promontory formations or the making of cavities on the inner periphery of the member.

Once the first Z charge has been formed, the intermediate layers or plies 31, 32, 33 whose curved reinforcing fibers are oriented circumferentially (or at 0°), are laid in position. The use of the prepreg tapes does not create any problem in forming the flanges 32 and 33 of the Z cross section, where the tapes are laid on cylindrical surfaces, on the flanges 22 and 23, respectively, of the first charge 20. To form the layers 31 of the web, strips of prepreg 31a oriented circumferentially and lying on the radial surface of the web portion 21 of the first charge 20 are carefully laid in a rainbow-like design. Experimental tests by the Applicant have shown that the formation of the web layers 31 does not produce wrinkles in the radially inner part of each strip 31a if prepreg strips are used that are not wider than 12 mm in the radial direction. These strips can be laid in groups of 8, side by side in the axial direction, by means of a fibre placement machine of known type.

Depending on design requirements, doublers 40 are provided (FIG. 3), after which the second Z charge 50 is formed on a separate mandrel (not shown), following the same steps as described above in relation to the formation of the first charge 20. Briefly, beginning with a flat arcuate laminate, the outer 52 and inner 53 flanges are bent using a mandrel having a series of radially outer promontory formations to prevent wrinkles in the area of the outer flange, in much the same way as described above in relation to the flange 22.

The second charge 50 is that side of the member 10 which will be towards the vacuum bag during the subsequent curing step in the autoclave. Like the first charge 11, the second charge 50 comprises preferably a lamination of layers of unidirectional prepreg tapes combined together and oriented for example at 45°, −45°, 90°, −45° and 45°.

Once the lay-up of the charges is completed, the process is continued by the use of a vacuum bag, using equipment which is known in the field, such as a separator film, a ventilation fabric, a bag film sealed onto the edges of the curing tool, and fitting of vacuum valves to this bag film. Finally the member is cured and compacted by performing a combined pressure and temperature cycle to compact the layers and activate the curing of the resin. In some applications, the vacuum and temperature alone are sufficient to compact and cure the member.

It is not intended for the invention to be limited to the embodiment described and illustrated above; instead, the invention can be modified in terms of shape and dimensions, arrangements of parts and design details. For example, the invention is equally applicable for manufacturing structural members having cross sections with shapes other than a Z, in particular C, L, T, etc. cross sections.

What is claimed is:

1. A method of manufacturing an arcuate structural member of a fuselage frame of composite material uses tapes of resin pre-impregnated unidirectional fibers, the member includes a web lying in a radial plane and at least one radially outer cylindrical flange, the method comprising the steps of:
   providing an elongate, arcuate forming mandrel having a flat radial surface forming an angular edge with a radially outer, convex cylindrical surface;
   providing a plurality of promontory-shaped formations radiating outwardly with respect to the cylindrical surface;
   laying a plurality of layers of pre-impregnated composite material on the forming mandrel to form at least a first flat arcuate laminate, with a part of the laminate projecting radially outwardly beyond the angular edge;
   covering the mandrel, the laminate and the promontory formations with a membrane;
   applying a vacuum underneath the membrane, causing the membrane to urge the projecting part of the laminate against the cylindrical surface and against the promontory formations, whereby the projecting part, bent by the membrane, partially copies the shape of the cylindrical surface of the mandrel in the intermediate areas between the promontory formations, whereas these prevent or retard the contact of the projecting part with the cylindrical surface near the promontory formations;
   removing discrete portions of the projecting part near the promontory formations, obtaining peripheral cavities spaced apart from one another by flange lengths in the form of cylindrical segments.

2. A method according to claim 1, wherein the first laminate comprises a web portion formed by layers having fibers oriented at angles different from 0° with respect to the circumferential direction in which the arcuate member extends, the method including the step of laying on the web portion a plurality of layers of pre-impregnated composite material comprising strips with curved reinforcing fibers oriented circumferentially, each strip having a width not exceeding 12 mm as measured in the radial direction.

3. A method according to claim 2, wherein the strips are laid in stacks, side by side in the axial direction.

4. A method according to claim 1, wherein each promontory formation includes a dome-shaped body.

5. A method according to claim 4, wherein each dome-shaped body is connected to the outer cylindrical surface of the mandrel by a radially oriented wall or rib for supporting the membrane during the vacuum step.

6. A method according to claim 5, wherein the radially oriented wall is vertical.

7. A method according to claim 1, wherein the arcuate forming mandrel has a Z-shaped cross section with a web lying in a radial plane, a radially outer flange and a radially inner flange, the radially outer flange and the radially inner flange forming two coaxial cylindrical surfaces.

* * * * *